No. 699,765. Patented May 13, 1902.
C. H. PLUMMER & F. T. STARE.
METHOD OF CANNING CORN OR OTHER VEGETABLES.
(Application filed Feb. 7, 1901.)
(No Model.)
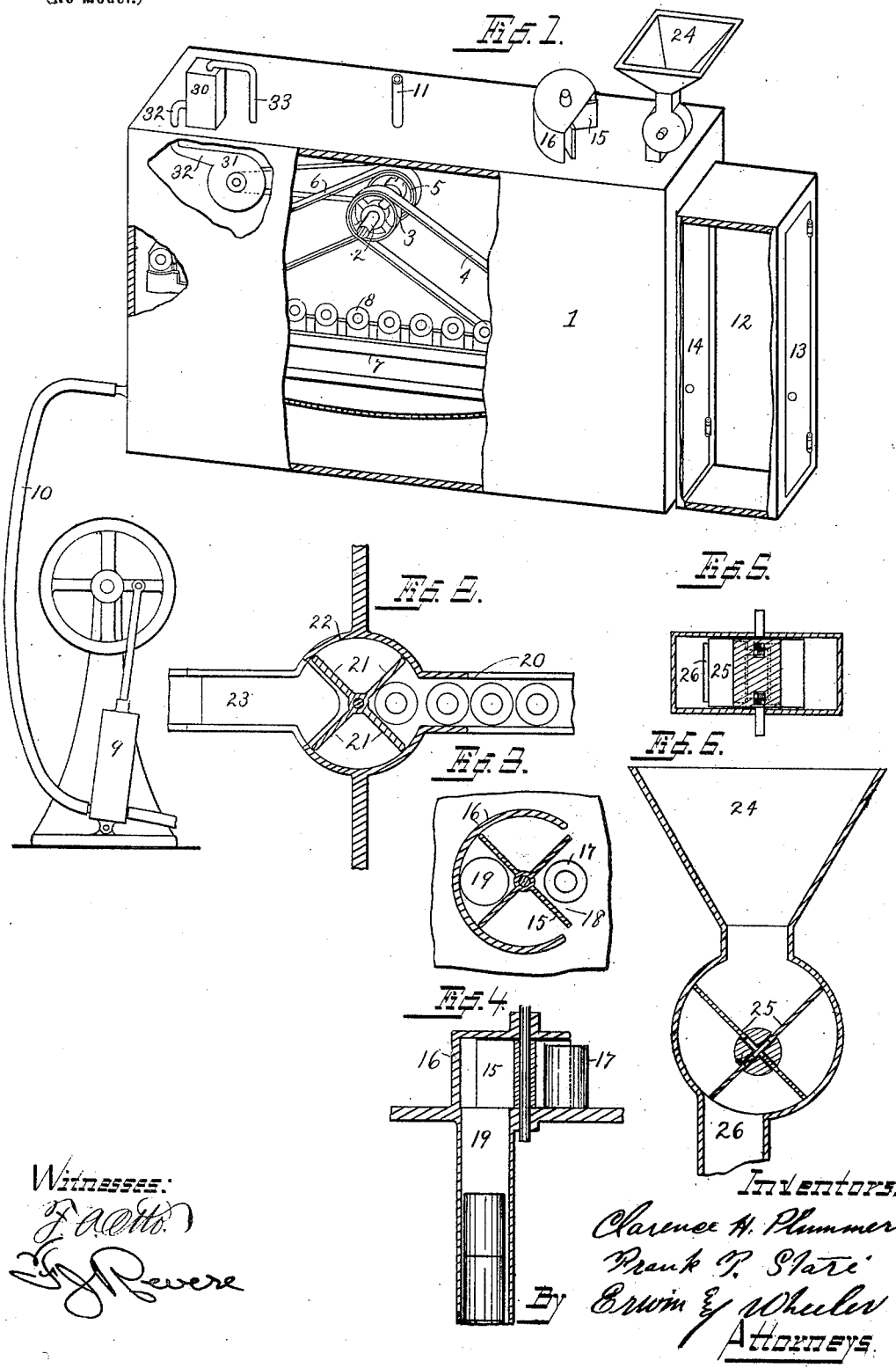

UNITED STATES PATENT OFFICE.

CLARENCE H. PLUMMER AND FRANK T. STARE, OF WAUKESHA, WISCONSIN.

METHOD OF CANNING CORN OR OTHER VEGETABLES.

SPECIFICATION forming part of Letters Patent No. 699,765, dated May 13, 1902.

Application filed February 7, 1901. Serial No. 46,291. (No specimens.)

*To all whom it may concern:*

Be it known that we, CLARENCE H. PLUMMER and FRANK T. STARE, citizens of the United States, residing at Waukesha, county of Waukesha, and State of Wisconsin, have invented new and useful Improvements in Methods of Canning Corn or other Vegetables, of which the following is a specification.

Our invention relates to improvements in methods for canning corn and other vegetables.

In canning corn or preserving green corn according to the practice heretofore prevailing the corn is first partially cooked, then pressed into the can in a hot and steaming condition, whereupon the can is sealed and subsequently cooked in a retort for a prolonged period of time, during which the retort is maintained at a fixed temperature much higher than the boiling-point in the open air. In other words, the cans are filled with corn at a temperature of about 200° Fahrenheit, after which they are sealed and subjected to a temperature of about 250° Fahrenheit for a considerable period of time. This method is expensive, owing to the great length of time required for the heat to reach the center of the can sufficiently to thoroughly sterilize all the corn, and great care must be exercised in order that the corn shall not be discolored; but even with the greatest care great loss often results from an insufficient sterilization and the consequent fermentation; yet this practice has been followed, for the reason that it has heretofore been considered impossible to first cook and sterilize the corn and then fill the cans with it at a temperature sufficient to prevent fermentation without a subsequent cooking after the cans are sealed, owing to the fact that such high temperatures produce a rapid and violent ebullition of the partially-liquid mass, which makes it impossible to properly fill the cans under the conditions heretofore existing.

The object of our invention is to provide a method whereby the operation of cooking and sterilizing the corn and other vegetables may be first completed and the cans then filled while the material is at a temperature considerably above the boiling-point in open air without causing such an ebullition of the contents of the cans as will prevent the cans from being properly filled and sealed.

In the following description reference is had to the accompanying drawings, in which—

Figure 1 is a side elevation of an inclosed chamber used in carrying out our improved method, with the walls of said chamber partially broken away. Fig. 2 is a horizontal sectional view of the discharge-gate for the cans. Fig. 3 is a similar view of the gate for delivering the cans to the interior of the chamber. Fig. 4 is a vertical sectional view of the same, together with the chute down which the cans are passed to the cooker. Figs. 5 and 6 are horizontal and vertical sectional views, respectively, of a device for feeding corn into the chamber preparatory to cooking the same.

Like parts are identified by the same reference-figures throughout the several views.

1 is a closed air-tight chamber or receptacle, within which the apparatus for cooking the corn and sealing the cans may be located.

2 is a driving-shaft entering from the exterior through any suitable stuffing-box and provided with a pulley 3, from which motion is communicated to any ordinary form of cooker and can-filler by means of a belt 4. Motion is also communicated from the shaft 2 to a can-sealing machine by means of the pulley 5 and belt 6. Both the cooker and the can-filling machine may be made of any ordinary type, and we have, therefore, not illustrated any specific form of machine. The conveyer 7 is, however, used to transfer the filled cans 8 from the cooker and the filler to the sealing-machine.

9 is an air-pump having its discharge-port connected by a pipe 10 with the interior of the chamber 1, and 11 is a vent-pipe of considerably less capacity than that of the pipe 10. The air in the chamber 1 is maintained at a pressure greater than that of the external atmosphere and at a sufficient pressure to prevent the corn from boiling while the cans are being filled and sealed. Where the corn is heated to a temperature of about 250°, it will be necessary to maintain a pressure in the chamber 1 of about two atmospheres or fifteen pounds to the inch in excess of that of the external air.

In order to permit the persons in charge of the machines to enter and leave the chamber 1 without materially reducing the internal pressure, we have provided a vestibule 12, having a door 13 leading to the exterior and a door 14 leading to the interior of the chamber 1. As the vestibule is of relatively small size in proportion to the chamber, it is obvious that by first entering the vestibule and closing the door 12 a person may then open the door 14 and enter the chamber 1 without materially reducing the pressure therein.

In order to deliver a supply of cans to the exterior of the chamber 1, we have provided a gate consisting in a set of rotary wings 15, revolving in a cylindrical casing 16, the wings being arranged to revolve in air-excluding contact with the walls of the casing. The cans 17 are inserted between the wings 15 through an aperture 18 in one side of the casing, substantially as shown in Fig. 3, the wings being then revolved to carry the can into registry with the mouth of the chute 19, when the cans drop by gravity to the bottom of the chute or into contact with other cans previously delivered thereto. The lower end of the chute 19 is contracted, so that the cans will substantially fill the same and prevent the escape of any material quantity of air through the chute. A somewhat similar device is used for discharging the filled cans from the chamber, the cans being delivered from the sealing-machine along a conveyer 20, when they are caught between wings 21, operating in a cylinder 22, located in one of the side walls of the chamber, the cans being carried by the wings 21 around the cylinder and discharged into an inclined passage-way 23, exterior to the chamber-walls. For delivering the corn into the chamber we have provided a hopper 24, from which the corn is fed into rotary measuring-receptacles 25, which revolve alternately into registry with the mouth of the hopper 24 and with a chute 26, leading to the interior of the chamber.

In order to provide for a supply of gas for heating the soldering-heads of the heading-machine, we have provided a carbureter 30, through which compressed air is driven from a blower 31, located in the interior of the chamber 1, through a pipe 32. The gas returns to the chamber 1 through pipe 33. The gas-supply is therefore unaffected by the difference between the internal pressure of the chamber and the external atmosphere.

We do not, however, limit the scope of our invention to any specific means for maintaining a constant supply of cans or cans within the chamber or for delivering cans from the interior to the exterior of such chamber, nor do we limit the scope of our invention to any specific apparatus, it being obvious that a great variety of devices may be employed in carrying out the method herein described.

It is well understood that the normal boiling-point of materials of the described class is approximately 212° Fahrenheit, this being the temperature at which water will boil under normal atmospheric pressure. Our invention contemplates raising the temperature sufficiently above this point to thoroughly sterilize the material preparatory to its insertion in the can, and relates particularly to the means whereby the material may be transferred to the cans and the latter sealed while the temperature remains at a point which would cause such an immediate vaporization of the water as to throw the contents of the cans out explosively unless subjected to pressure considerably in excess of that of the normal atmosphere. By our process, however, the maintenance of an air-pressure sufficient to balance the internal steam-pressure of the material enables us to fill the cans and transfer them to the position for sealing without reduction of temperature or loss of ebullition.

What we claim as new, and desire to secure by Letters Patent, is—

1. The method of canning corn and other vegetables, consisting in, first, cooking the same and raising the temperature thereof to a point considerably in excess of the normal boiling-point; second, filling the cans with corn at such temperature, under a surrounding atmospheric pressure greater than the normal pressure of the atmosphere, and sufficient to prevent the ebullition of the contents of the cans; and third, sealing the cans while the contents are maintained at such temperature, and with the cans and contents subjected to such surrounding pressure.

2. The method of canning corn, and other vegetables, consisting in filling and sealing cans at a temperature in excess of the normal boiling-point, and simultaneously subjecting the cans and contents to a surrounding atmospheric pressure sufficiently in excess of the normal pressure, to prevent ebullition.

3. The method of canning corn, and other vegetables, consisting in, first, cooking the vegetables; second, in filling the cans; and third, in sealing the cans, all of said steps being performed under a surrounding atmospheric pressure greater than normal.

4. The method of canning corn, or other vegetables, consisting, first, in cooking the material and raising the temperature thereof materially above the normal boiling-point; second, filling the cans with material, at said temperature, and simultaneously applying an external air-pressure thereto sufficient to balance the internal steam-pressure of the material; and third, sealing the cans while such pressure is maintained.

In testimony whereof we affix our signatures in the presence of two witnesses.

CLARENCE H. PLUMMER.
FRANK T. STARE.

Witnesses as to signature of Clarence H. Plummer:
DAVID F. MATCHETT,
ARCHIBALD CATTELL.

Witnesses as to signature of Frank T. Stare:
JAS. B. ERWIN,
L. C. WHEELER.